(12) United States Patent
Venugopal et al.

(10) Patent No.: US 11,990,982 B2
(45) Date of Patent: May 21, 2024

(54) SIGNALING MODEL PARAMETERS THAT INDICATE A TIME CORRECTION AND/OR A FREQUENCY CORRECTION FOR AN UPLINK TRANSMISSION

(71) Applicant: QUALCOMM Incorporated, San Diego, CA (US)

(72) Inventors: Kiran Venugopal, Raritan, NJ (US); Changhwan Park, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/805,123

(22) Filed: Jun. 2, 2022

(65) Prior Publication Data
US 2023/0396331 A1 Dec. 7, 2023

(51) Int. Cl.
H04B 7/185 (2006.01)
H04W 56/00 (2009.01)
H04W 84/06 (2009.01)

(52) U.S. Cl.
CPC ..... H04B 7/18582 (2013.01); H04B 7/18543 (2013.01); H04W 56/005 (2013.01); H04W 84/06 (2013.01)

(58) Field of Classification Search
CPC ........... H04B 7/18582; H04B 7/18543; H04W 56/005; H04W 84/06
See application file for complete search history.

(56) References Cited

U.S. PATENT DOCUMENTS

| | | | |
|---|---|---|---|
| 7,477,986 B1* | 1/2009 | Young | G01C 21/188 701/518 |
| 10,554,293 B1* | 2/2020 | Chin | H04W 74/006 |
| 2001/0022539 A1* | 9/2001 | Jakobsson | H03J 1/0058 331/172 |
| 2006/0008026 A1* | 1/2006 | Wood | H03F 1/3241 375/296 |
| 2006/0206586 A1* | 9/2006 | Ling | H04W 4/02 709/219 |
| 2007/0064665 A1* | 3/2007 | Zhang | H04W 52/48 370/343 |
| 2009/0161599 A1* | 6/2009 | Haartsen | H04W 74/0891 455/434 |
| 2009/0268709 A1* | 10/2009 | Yu | H04L 25/0232 370/350 |
| 2013/0170415 A1* | 7/2013 | Fukuta | H04W 52/0216 370/311 |
| 2014/0302876 A1* | 10/2014 | Oizumi | G04R 20/14 455/456.3 |

(Continued)

OTHER PUBLICATIONS

Lin X., et al., "On the Path to 6G: Embracing the Next Wave of Low Earth Orbit Satellite Access", IEEE, 2021, 7 Pages.

*Primary Examiner* — Christine Ng
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node associated with a non-terrestrial network, an indication of one or more model parameters that indicate one or more of a time correction or a frequency correction. The UE may transmit, to the network node, an uplink transmission based at least in part on the one or more model parameters. Numerous other aspects are described.

30 Claims, 11 Drawing Sheets

(56) References Cited

U.S. PATENT DOCUMENTS

| | | | |
|---|---|---|---|
| 2015/0140996 A1* | 5/2015 | Wang | H04L 43/12 |
| | | | 455/423 |
| 2016/0219579 A1* | 7/2016 | Yamazaki | H04W 56/003 |
| 2018/0206063 A1* | 7/2018 | Frenger | G01S 5/0236 |
| 2018/0241464 A1* | 8/2018 | Michaels | H04W 56/0045 |
| 2019/0050061 A1* | 2/2019 | Børstad | G06F 3/038 |
| 2019/0245613 A1* | 8/2019 | Roy | H04L 61/5061 |
| 2020/0245137 A1* | 7/2020 | Chitrakar | H04W 52/0219 |
| 2020/0404737 A1* | 12/2020 | Cariou | H04W 48/14 |
| 2021/0211162 A1* | 7/2021 | Yeste Ojeda | H04B 7/043 |
| 2021/0356985 A1* | 11/2021 | Wei | H03L 7/0995 |
| 2022/0255693 A1* | 8/2022 | Lou | H04L 27/2613 |
| 2022/0286198 A1* | 9/2022 | Khan | H04W 56/0045 |
| 2023/0024479 A1* | 1/2023 | Ciochina | H04B 7/18541 |
| 2023/0217395 A1* | 7/2023 | Castelain | H04L 27/265 |
| | | | 370/350 |
| 2023/0422195 A1* | 12/2023 | Yao | H04B 7/18513 |

* cited by examiner

SIGNALING MODEL PARAMETERS THAT INDICATE A TIME CORRECTION AND/OR A FREQUENCY CORRECTION FOR AN UPLINK TRANSMISSION

FIELD OF THE DISCLOSURE

Aspects of the present disclosure generally relate to wireless communication and to techniques and apparatuses for signaling model parameters that indicate a time correction and/or a frequency correction for an uplink transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network node associated with a non-terrestrial network, an indication of one or more model parameters that indicate one or more of a time correction or a frequency correction; and transmit, to the network node, an uplink transmission based at least in part on the one or more model parameters.

In some implementations, an apparatus for wireless communication at a network node includes a memory and one or more processors, coupled to the memory, configured to: transmit, to a UE associated with a non-terrestrial network, an indication of one or more model parameters that indicate one or more of a time correction or a frequency correction; and receive, from the UE, an uplink transmission based at least in part on the one or more model parameters.

In some implementations, a method of wireless communication performed by a UE includes receiving, from a network node associated with a non-terrestrial network, an indication of one or more model parameters that indicate one or more of a time correction or a frequency correction; and transmitting, to the network node, an uplink transmission based at least in part on the one or more model parameters.

In some implementations, a method of wireless communication performed by a network node includes transmitting, to a UE associated with a non-terrestrial network, an indication of one or more model parameters that indicate one or more of a time correction or a frequency correction; and receiving, from the UE, an uplink transmission based at least in part on the one or more model parameters.

In some implementations, a non-transitory computer-readable medium storing a set of instructions for wireless communication includes one or more instructions that, when executed by one or more processors of a UE, cause the UE to: receive, from a network node associated with a non-terrestrial network, an indication of one or more model parameters that indicate one or more of a time correction or a frequency correction; and transmit, to the network node, an uplink transmission based at least in part on the one or more model parameters.

In some implementations, a non-transitory computer-readable medium storing a set of instructions for wireless communication includes one or more instructions that, when executed by one or more processors of a network node, cause the network node to: transmit, to a UE associated with a non-terrestrial network, an indication of one or more model parameters that indicate one or more of a time correction or a frequency correction; and receive, from the UE, an uplink transmission based at least in part on the one or more model parameters.

In some implementations, an apparatus for wireless communication includes means for receiving, from a network node associated with a non-terrestrial network, an indication of one or more model parameters that indicate one or more of a time correction or a frequency correction; and means for transmitting, to the network node, an uplink transmission based at least in part on the one or more model parameters, wherein the one or more model parameters are applied by the apparatus to the uplink transmission.

In some implementations, an apparatus for wireless communication includes means for transmitting, to a UE associated with a non-terrestrial network, an indication of one or more model parameters that indicate one or more of a time correction or a frequency correction; and means for receiving, from the UE, an uplink transmission based at least in part on the one or more model parameters.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
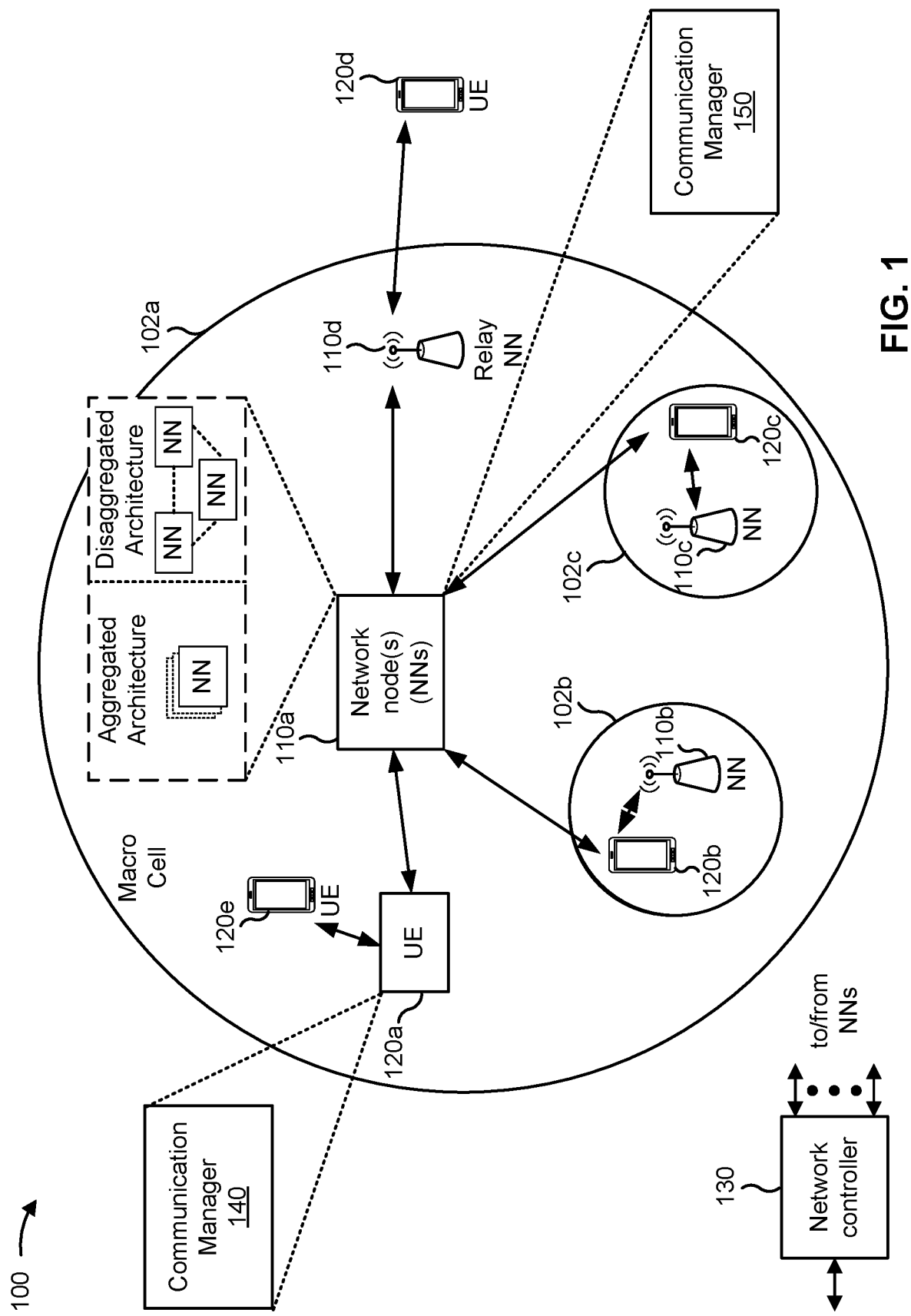
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node associated with a non-terrestrial network, an indication of one or more model parameters that indicate one or more of a time correction or a frequency correction; and transmit, to the network node, an uplink transmission based at least in part on the one or more model parameters. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE associated with a non-terrestrial network, an indication of one or more model parameters that indicate one or more of a time correction or a frequency correction; and receive, from the UE, an uplink transmission based at least in part on the one or more model parameters. Additionally, or alternatively, the communication manager 150 may perform one or more other operations described herein.

As indicated above, FIG. 1 is provided as an example. Other examples may differ from what is described with regard to FIG. 1.

Figure 2:
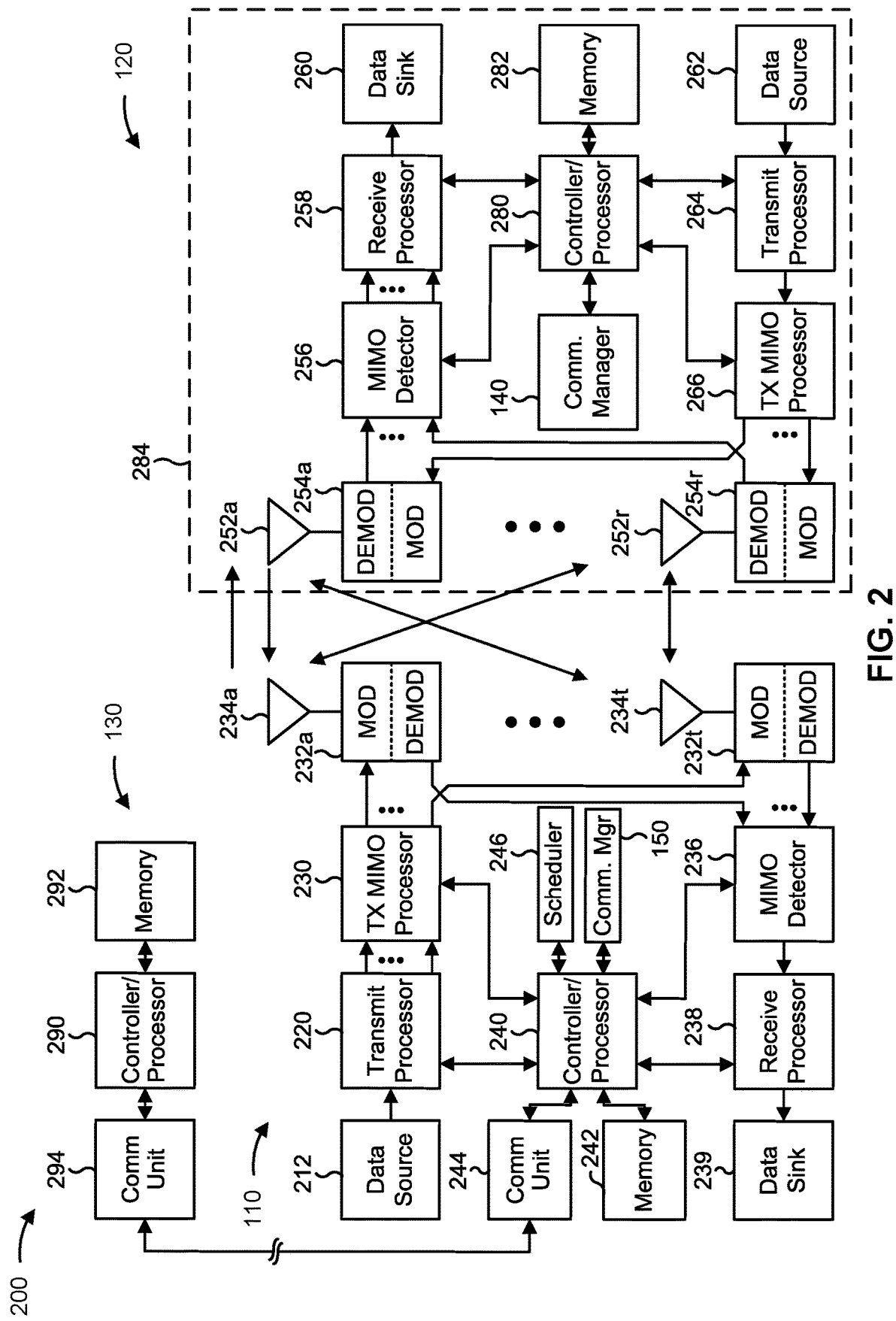
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the network node 110, the controller/processor 280 of the UE 120, and/or any other component(s) of FIG. 2 may perform one or more techniques associated with signaling model parameters that indicate a time correction and/or a frequency correction for an uplink transmission, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node associated with a non-terrestrial network, an indication of one or more model parameters that indicate one or more of a time correction or a frequency correction; and/or means for transmitting, to the network node, an uplink transmission based at least in part on the one or more model parameters. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to a UE associated with a non-terrestrial network, an indication of one or more model parameters that indicate one or more of a time correction or a frequency correction; and/or means for receiving, from the UE, an uplink transmission based at least in part on the one or more model parameters. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
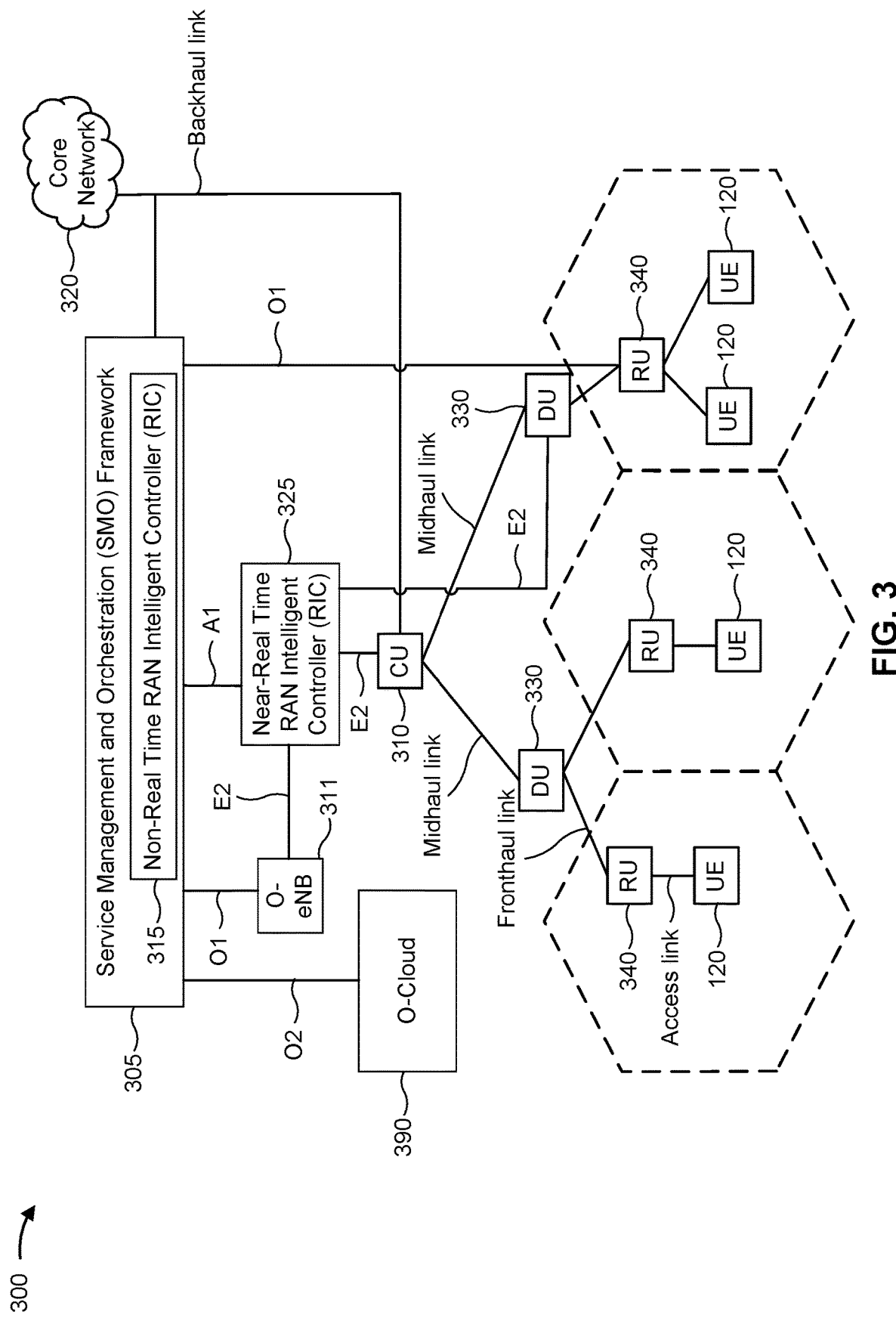
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT MC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
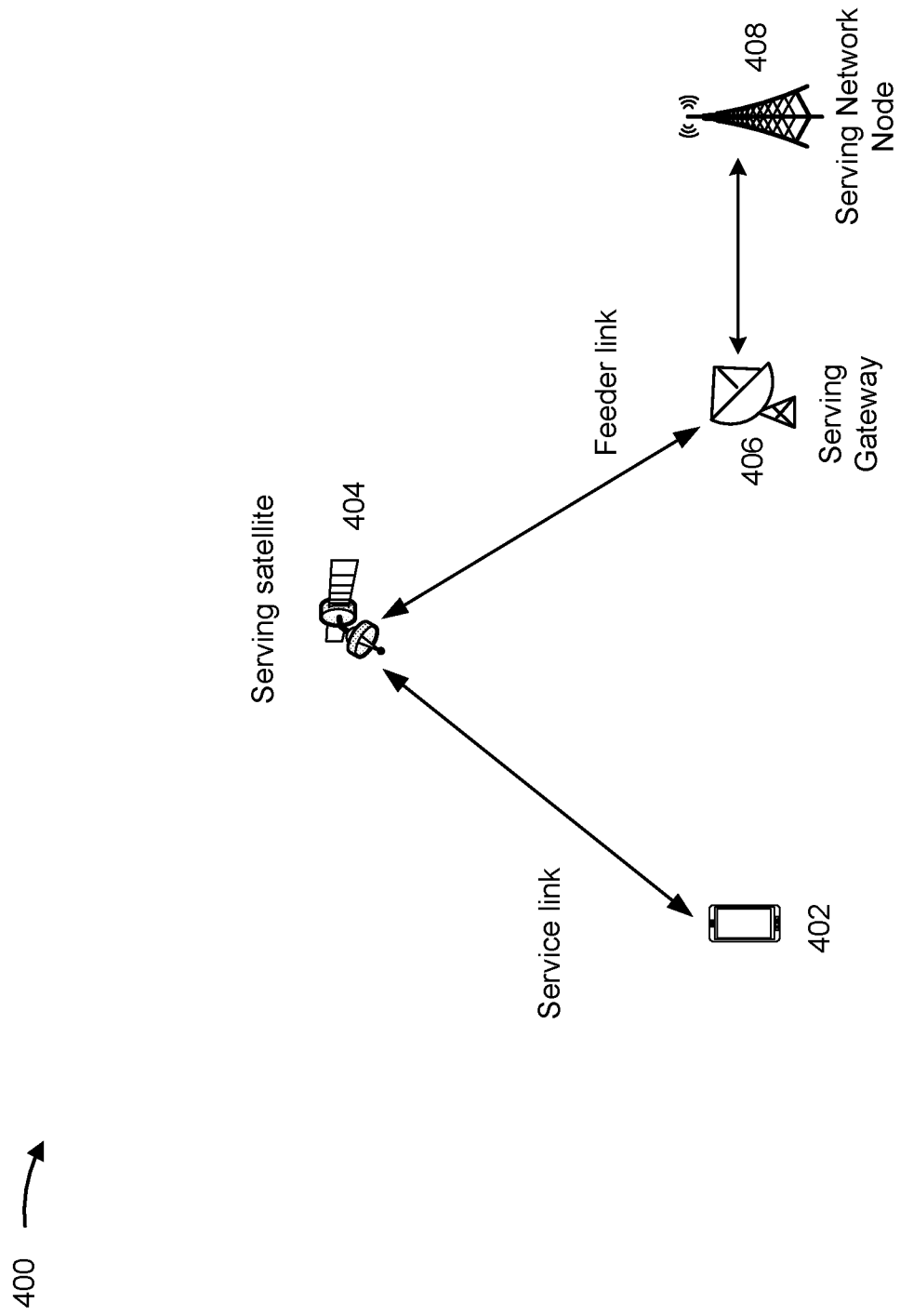
FIG. 4 is a diagram illustrating an example of a non-terrestrial network (NTN) architecture, in accordance with the present disclosure.

FIG. 4 is a diagram illustrating an example 400 of a non-terrestrial network (NTN) architecture, in accordance with the present disclosure.

As shown in FIG. 4, a UE 402 in a connected mode may communicate with a serving network node 408 via a serving satellite 404 in the NTN architecture. The UE 402 may transmit an uplink transmission to the serving satellite 404. The serving satellite 404 may relay the uplink transmission to the serving network node 408 via a serving gateway 406. The serving network node 408 may transmit a downlink transmission to the serving satellite 404 via the serving gateway 406. The serving satellite 404 may relay the downlink transmission to the UE 402. A communication link between the UE 402 and the serving satellite 404 may be a service link, and a communication link between the serving satellite 404 and the serving gateway 406 may be a feeder link.

As indicated above, FIG. 4 is provided as an example. Other examples may differ from what is described with regard to FIG. 4.

In mobile communication networks, a UE may perform time and frequency synchronization using a downlink reference signal, such as a synchronization signal block (SSB). The UE may perform an uplink transmission using an uplink time and frequency reference, which may be based at least in part on the time and frequency synchronization. In some cases, the uplink time and frequency reference may be misaligned. A misalignment may be due to a downlink frequency itself not exactly matching an assigned frequency (e.g., due to a carrier frequency offset (CFO) of a local oscillator). The misalignment may be due to an estimation error at the UE when using downlink synchronization reference signals. Different UEs may experience different propagation delays.

In an NTN, a misalignment of an uplink time and frequency reference may be worse, as compared to mobile communication networks, due to a high Doppler shift in a communication link. In the NTN, a satellite used for cellular access, such as a low earth orbit (LEO) satellite, may have a speed of approximately 8 kilometers per second. Such speeds may cause a Doppler shift on the order of 26 parts per million (ppm), which is much higher than the approximately 10 ppm due to oscillator inaccuracy. As a result, time and frequency misalignments in uplink transmissions from different UEs served by the same network node may be an issue for the NTN. Further, for beam-based communications, different beams may be associated with different Doppler shifts and power delay profiles (PDPs).

A timing advance enhancement may account for misalignments in a delay domain. A network node may indicate, to a UE, an amount of adjustment in the delay domain that is needed, based at least in part on which the UE may advance its uplink transmission. The timing advance ($T_{TA}$) enhancement may be defined by $T_{TA}=(N_{TA}+N_{TA,UE\text{-}specific}+N_{TA,\,common}+N_{TA,\,offset})\times T_C$, where $N_{TA}$ may be defined as 0 for a physical random access channel (PRACH) and may be updated based at least in part on a timing advance command field in a Message 2 or Message B and a medium access control control element (MAC-CE) timing advance command, $N_{TA,UE\text{-}specific}$ may be a UE self-estimated timing advance to pre-compensate for a service link delay, $N_{TA,\,common}$ may be a network-controlled common timing advance and may include any timing offset considered necessary by the network, $N_{TA,\,offset}$ may be a fixed offset used to calculate the timing advance, and $T_c$ is a basic time unit. Further, $N_{TA}$ may be a closed loop timing advance component, and $N_{TA,UE\text{-}specific}$ and $N_{TA,\,common}$ may be associated with open loop timing advance adjustments. Signaling for applying a frequency pre-compensation may be beneficial for aligning an uplink reception in time and frequency. The network node may indicate, to the UE, a frequency pre-compensation value, and the UE may pre-compensate its uplink transmission frequency based at least in part on the indication received from the network node.

A closed loop timing advance component in the timing advance command may be used by the network node to control a timing adjustment to be applied by the UE in an uplink. A frequency pre-compensation value may be provided for an uplink frequency correction/alignment to counter a Doppler drift. Open loop timing advance components may be partially controlled by the network node in terms of higher layer parameters (e.g., common timing advance and ephemeris information) associated with applying adjustments as a function of time. The open loop timing advance components may depend on a global navigation satellite system (GNSS) signal for accurate timing and for estimating frequency adjustments to the open loop timing advance components. When the open loop timing advance components can be calculated and estimated with near-zero error, the closed loop timing advance component may be unnecessary and redundant. In some cases, the GNSS signal may be unreliable and/or unavailable. Typical timing advance mechanisms and frequency adjustments may be based at least in part on an assumption of a GNSS-based position acquisition, so when the GNSS signal is not available, other mechanisms may be needed to autonomously track and synchronize an uplink timing and frequency.

For unmanned aerial vehicles (UAVs), a measurement report that is UE-triggered may be based at least in part on configured height thresholds. The measurement report may indicate a height, location, speed, and/or flight path associated with the UAV. A measurement report may be based at least in part on a configured quantity of cells (e.g., more than one cell) that simultaneously fulfill triggering criteria. Signaling may be defined to support a subscription-based aerial-UE identification. A UAV identification broadcast may be applicable to both LTE and NR, and may be based at least in part on a Uu interface and/or an unlicensed band. UE capability signaling may be used to indicate UAV beamforming capabilities, and may be based at least in part on FR1 with a directional antenna at a UE side.

A high-speed train (HST) deployment may involve a train that travels up to 350 miles per hour. In the HST deployment, communication links may suffer from large timing and Doppler shifts. Unlike in an NTN scenario, in an HST single frequency network (SFN), a UE mobility may cause the high Doppler in the communication link, as network nodes (e.g., remote radio heads (RRHs)) may be fixed and stationary.

The SFN may be employed in a multiple TRP (mTRP) configuration to improve coverage and reliability, where the same data may be transmitted over multiple TRPs on the same time and frequency resource. For the HST SFN, a frequency pre-compensation may be employed. A network node may pre-compensate its downlink transmit frequency while performing an SFN transmission to a UE onboard an HST.

Figure 5:
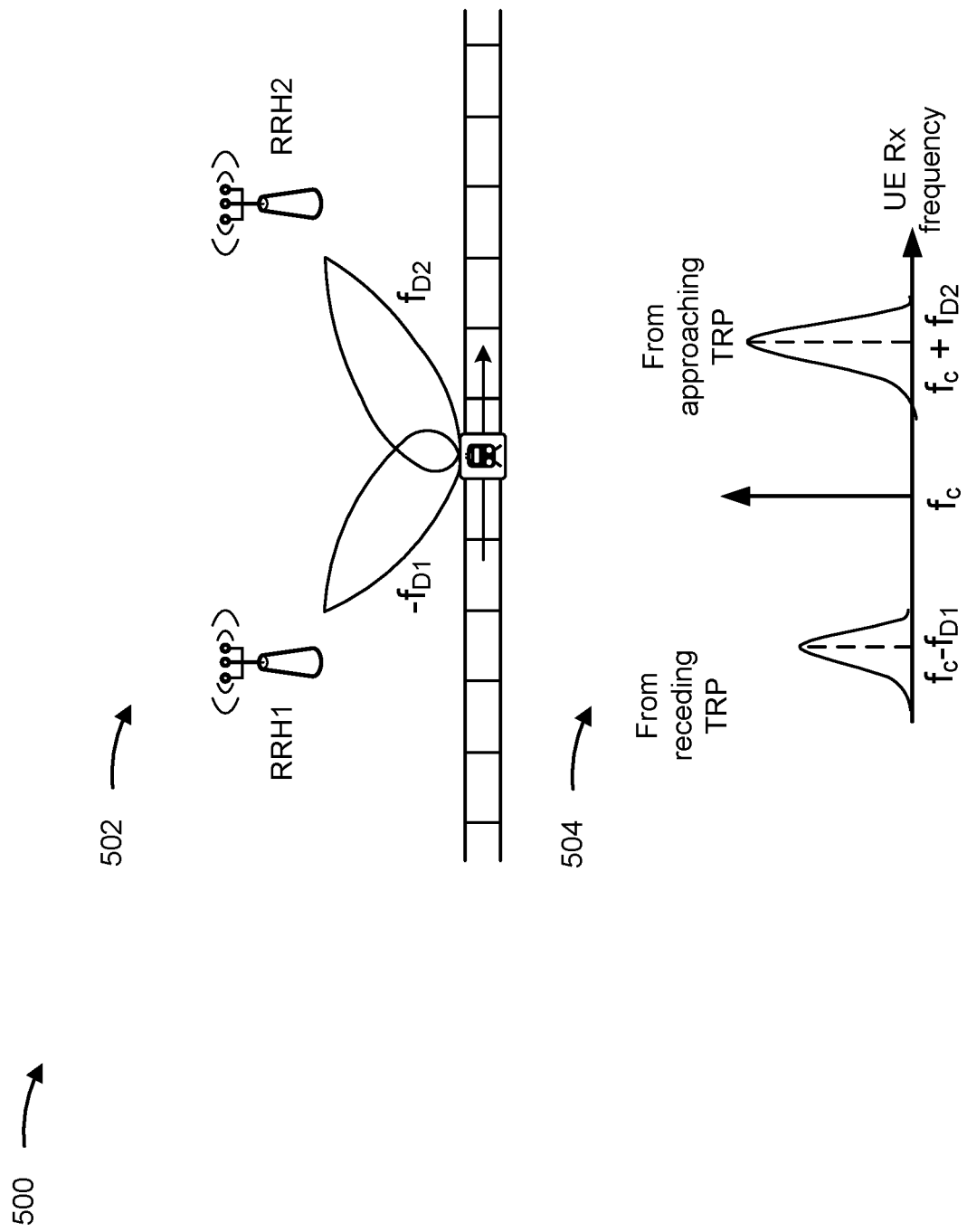
FIG. 5 is a diagram illustrating an example of a high-speed train (HST) deployment, in accordance with the present disclosure.

FIG. 5 is a diagram illustrating an example 500 of an HST deployment, in accordance with the present disclosure.

As shown by reference number 502, an HST, on which a UE is located, may be traveling at a high speed. At a point in time, the HST may be traveling between a first TRP (e.g., a first RRH) and a second TRP (e.g., a second RRH). The first TRP may be behind the HST, and the second TRP may be in front of the HST. In other words, with respect to the HST, the first TRP may be a receding TRP, and the second TRP may be an approaching TRP. The HST may be associated with a first Doppler shift (e.g., $-f_{D1}$) with respect to the first TRP, and the HST may be associated with a second Doppler shift (e.g., $+f_{D2}$) with respect to the second TRP.

As shown by reference number 504, in relation to a center frequency ($f_c$), a UE receive (Rx) frequency associated with the first TRP (e.g., the receding TRP) may be $f_c-f_{D1}$, and a UE Rx frequency associated with the second TRP (e.g., the approaching TRP) may be $f_c+f_{D2}$.

As indicated above, FIG. 5 is provided as an example. Other examples may differ from what is described with regard to FIG. 5.

Figure 6:
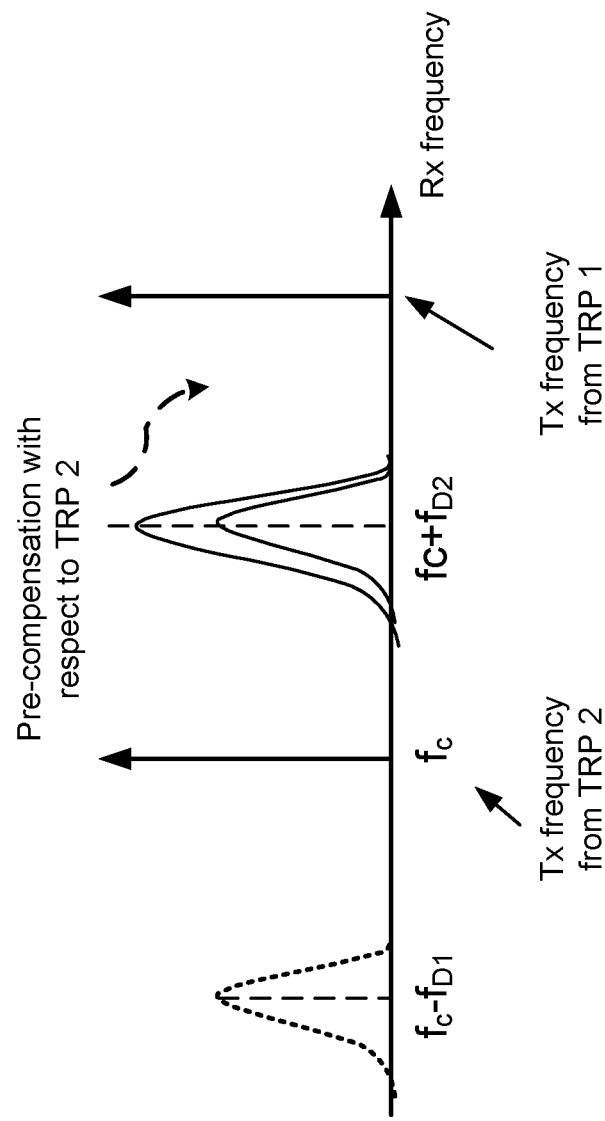
FIG. 6 is a diagram illustrating an example of an HST single frequency network (SFN) deployment, in accordance with the present disclosure.

FIG. 6 is a diagram illustrating an example 600 of an HST SFN deployment, in accordance with the present disclosure.

As shown in FIG. 6, in an HST SFN, a network node may apply a Tx pre-compensation in a delay and Doppler domain (e.g., a pre-compensation with respect to a second TRP). The Tx pre-compensation may be a per-TRP and/or per-beam pre-compensation in a downlink. The HST SFN may employ a beam-specific Doppler frequency compensation. A beam-specific delay pre-compensation may be employed to overcome a timing advance misalignment for an mTRP SFN deployment, since a propagation delay may be different for the various mTRP-UE links constituting an SFN channel.

As indicated above, FIG. 6 is provided as an example. Other examples may differ from what is described with regard to FIG. 6.

In an NTN, in a physical layer, applying a frequency correction and/or a time correction in an uplink transmission may be difficult. Due to high Doppler shifts in the NTN, even adjacent UEs within a cell that are served by a same satellite may experience different delays and Doppler domain channels. As a result, uplink transmissions using the same time and frequency acquired via common downlink reference signals may be significantly mismatched across UEs within the same cell. For example, using the same SSB, the times and/or frequencies acquired by different UEs within the same cell may be different. Due to high mobility involved in the NTN, retransmitting frequent timing advance commands (e.g., via MAC-CE) to adjust uplink transmissions from the UE, as well as transmitting a frequency pre-compensation indication, may not be feasible. Further, an $N_{TA,UE-specific}$ value that is estimated by the UE and/or a UE-estimated frequency pre-compensation value may suffer from errors and inaccuracy, such as a low signal-to-noise ratio (SNR), and some information (e.g., GNSS information) from a network node may be beneficial to remedy the errors and inaccuracy. For estimations, the UE may assume that a satellite is in line-of-sight (LoS) with the UE, but due to large communication link distances and the atmosphere, some scattering/dispersion may lead to non-LoS conditions, which may cause estimation errors.

In various aspects of techniques and apparatuses described herein, a UE may receive, from a network node associated with an NTN, an indication of one or more model parameters that indicate a time correction and/or a frequency correction. The UE may transmit, to the network node, an uplink transmission based at least in part on the one or more model parameters. The UE may autonomously apply the one or more model parameters to the uplink transmission without explicit instructions from the network node. The one or more model parameters may be higher-order parameters. The one or more model parameters may be based at least in part on a polynomial format or a table-based configuration. The one or more model parameters may be based at least in part on a beam, a TRP, and/or a panel used by the network node and/or the UE. The UE may track an evolution of one or more of a frequency shift or a timing advance command based at least in part on the one or more model parameters. By using the one or more model parameters, the UE may mitigate uplink transmission time/frequency misalignments.

Figure 7:
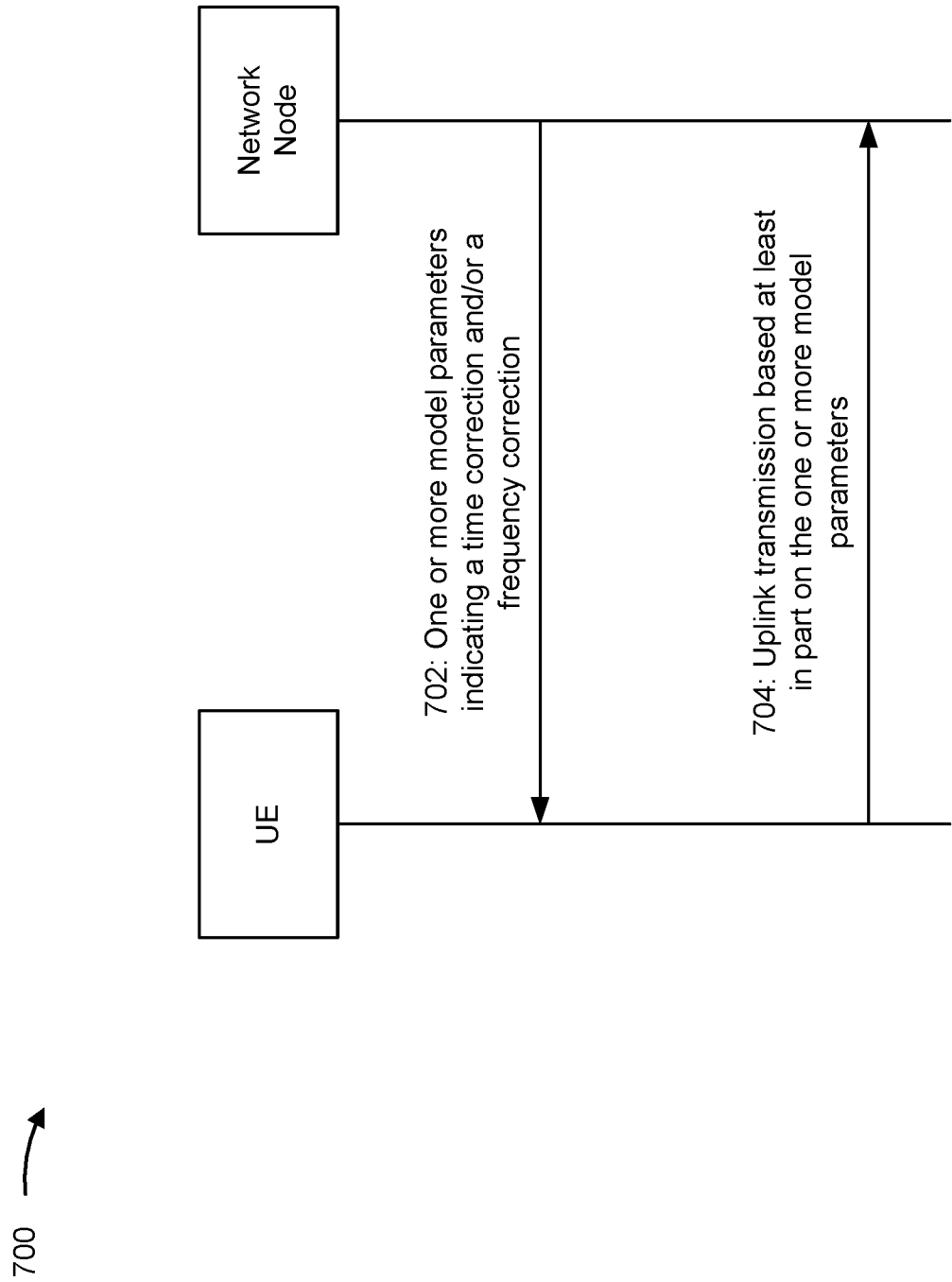
FIG. 7 is a diagram illustrating an example associated with signaling model parameters that indicate a time correction and/or a frequency correction for an uplink transmission, in accordance with the present disclosure.

FIG. 7 is a diagram illustrating an example associated with signaling model parameters that indicate a time correction and/or a frequency correction for an uplink transmission, in accordance with the present disclosure. As shown in FIG. 7, communication may occur between a UE (e.g., UE 120) and a network node (e.g., network node 110). In some aspects, the UE and the network node may be included in a wireless network, such as wireless network 100. In some aspects, the UE and the network node may be included in an NTN.

As shown by reference number 702, the UE may receive, from the network node, an indication (or configuration) of one or more model parameters that indicate a time correction and/or a frequency correction, to be applied (e.g., autonomously applied) by the UE to an uplink transmission to the network node. The UE may also receive, from the network node, an indication of a timing advance value and/or a Doppler pre-compensation value, which may also be applied by the UE to the uplink transmission. The UE may receive the one or more model parameters via RRC signaling or a MAC-CE. The one or more model parameters may be higher-order (e.g., first order) parameters, and the timing advance value and/or the Doppler pre-compensation value may be zero-order parameters. The one or more parameters may be based at least in part on a polynomial format or a table-based configuration. The one or more parameters may be broadcast, by the network node, to multiple UEs, including the UE, served by a same spatial resource. Thus, in addition to indicating the timing advance value and/or the Doppler pre-compensation value, the network node may also indicate the higher-order parameters indicating the time correction and/or the frequency correction. The network node may indicate, to the UE, a model and/or model parameters that indicate the time correction and/or the frequency correction.

In some aspects, the UE may track an evolution of a frequency shift and/or a timing advance command based at least in part on the one or more model parameters. The network node may configure and indicate the one or more model parameters, to the UE, for tracking the evolution of the frequency shift and/or the timing advance command. In some aspects, the one or more model parameters may be based at least in part on a beam, a TRP, and/or a panel used by the network node. In some aspects, the one or more parameters may be based at least in part on a beam and/or a panel used by the UE. In other words, the one or more model parameters may be per beam, TRP, and/or panel used by the network node, and additionally, the one or more model parameters may be per UE. In some aspects, the one or more model parameters may be associated with a UE position, a distance between the UE and the network node, and/or a relative trajectory of the UE.

In some aspects, the one or more model parameters may be in terms of a correlation matrix or filter coefficients used to track dynamics of variables of interest. The correlation matrix and the filter coefficients may be different sets of parameters, such that a first set may be associated with the time correction and a second set may be associated with the frequency correction. The variables of interest may include a timing advance value and/or a frequency pre-compensation value. The correlation matrix and/or the filter coefficients may be based at least in part on a relative trajectory of the UE. In other words, the network node may obtain such information based at least in part on knowledge of the relative trajectory of the UE.

In some aspects, the UE may receive, from the network node, the indication of the one or more model parameters based at least in part on one or more UE capabilities. The UE may indicate the one or more UE capabilities to the network node. For example, the UE may signal, to the network node, a first indication of a first capability associated with the time correction. The UE may signal, to the network node, a second indication of a second capability associated with the frequency correction. In some cases, the UE may signal, to the network node, a single indication of a capability associated with both the time correction and the frequency correction.

In some aspects, the UE may transmit, to the network node, one or more requests for the network node to enable or disable a feature associated with transmitting the one or more model parameters. The UE may transmit, to the network node, a first request to enable/disable a feature associated with transmitting one or more model parameters associated with the time correction. The UE may transmit, to the network node, a second request to enable/disable a feature associated with transmitting one or more model parameters associated with the frequency correction. The UE may transmit, to the network node, a joint request to enable/disable a feature associated with transmitting one or more model parameters associated with both the time correction and the frequency correction. The network node may turn on/off such a feature, or the UE may request to enable/disable such a feature.

In some aspects, the UE may transmit, to the network node, a request for an update of the one or more model parameters. The request may be based at least in part on a location condition associated with the UE. The UE may receive, from the network node, one or more updated model parameters based at least in part on the request. Thus, the UE may request a new configuration/indication of the one or more model parameters based at least in part on local conditions at the UE.

In some aspects, the one or more model parameters may be associated with a time stamp. The one or more model parameters may become invalid after a defined time window, and one or more updated model parameters may be signaled by the network node to the UE. After the defined time window, the one or more model parameters may expire, and a new set of model parameters may be signaled by the network node to the UE. After the one or more model parameters expire or time out, the UE may use the one or more updated model parameters, or the UE may revert to a legacy model and corresponding model parameters.

In some aspects, the one or more model parameters may compensate for errors or mismatches in other quantities associated with the time correction or the frequency correction. The other quantities may include a UE-specific timing advance value ($N_{TA,UE-specific}$), a common timing advance value ($N_{TA, common}$), or a fixed offset value ($N_{TA, offset}$). The one or more model parameters may compensate for the errors/mismatches in quantities associated with the time correction and/or the frequency correction, and the one or more model parameters may capture non-linearities in associated variables.

As shown by reference number 704, the UE may transmit, to the network node, the uplink transmission based at least in part on the one or more model parameters. The UE may autonomously apply the one or more model parameters to the uplink transmission without explicit instructions from the network node. The one or more model parameters, which may correspond to higher-order (e.g., first order) information, may enable the UE to apply the time correction and/or the frequency correction more autonomously, rather than waiting for explicit commands from the network node, thereby reducing signaling overhead. In other words, the UE may adjust the time and/or frequency of the uplink transmission based at least in part on the one or more model parameters.

In some aspects, the UE may apply the time correction and/or the frequency correction more autonomously based at least in part on a revised timing advance model, which may be represented by $T_{TA}=(N_{TA}+f(\dot{N}_{TA})+N_{TA,UE-specific}+N_{TA, common}+N_{TA, offset})\times T_c$. Here, similar to an open loop timing advance adjustment, $f(\dot{N}_{TA})$ may correspond to the one or more model parameters used for indicating the time correction. Further, $f(\dot{N}_{TA})$ may be in polynomial form in terms of parameters that are associated with the UE position, the distance to the network node, and/or relative trajectories of the UE.

As a first example, $f(\dot{N}_{TA})= \overline{N}_{TA}(x(t_0))+N'_{TA}(x(t))\times(t-t_0)+N''_{TA}(x(t))\times(t-t_0)^2+\ldots$, where x(t) indicates trajectory information, $t_0$ indicates a time instance at which a timing advance or frequency adjustment command is obtained, $N'_{TA}$ (x(t)) is a timing advance drift as a function of the trajectory information, $N''_{TA}$ (x(t)) is a timing advance drift variation as a function of the trajectory information, and $\overline{N}_{TA}$ (x($t_0$)) is a timing advance value as a function of an initial position. As a second example, $f(\dot{N}_{TA})$ is such that $\overline{N}_{TA}$ (t)=A(x(t))$\overline{N}_{TA}$(t-1) is recursively obtained with A (x(t)) being configured or derived as a function of the trajectory information. Alternatively, components for determining the time correction and/or the frequency correction (e.g., timing and frequency variation) may be configured as a read-off table, instead of a formula.

In some aspects, the one or more model parameters associated with the time correction and/or the frequency correction may be applicable to various types of communication networks, but may be more relevant for NTNs in which the issue of an uplink transmission time/frequency misalignment may be more problematic. NTNs may provide satellite integration for mobile stakeholders, including remote areas, onboard aircrafts, and/or vessels. In some aspects, the one or more model parameters associated with the time correction and/or the frequency correction may be appropriate for use cases in which a UE location and/or trajectory is readily available, such as for UEs within an HST or cruise ship, or service to a drone aircraft or UAV via the NTN. For UEs within the HST or cruise ship, location information of the UEs may not be directly available, but position and/or trajectory information of the HST or the cruise ship carrying the UEs may be available. Signaling involved in conveying the position and/or the trajectory information of a representative node (e.g., a train, ship, or aircraft) may be a group common message for a service link plus an additional delta regarding an actual node (e.g., a UE), if available. The signaling may be the group common message to reduce an overhead involved in tracking and indicating the time correction and/or the frequency correction needed for the uplink transmission.

In some aspects, the UE may track the time correction and/or the frequency correction (e.g., a timing and/or frequency adjustment) for the uplink transmission more robustly to ensure better time/frequency alignment at the network node. With existing mechanisms, a time/frequency correction error may accumulate over time, whereas using the one or more model parameters, as described herein, to indicate the time correction and/or the frequency correction may allow for residual error minimization by accounting for non-linearities. By using the one or more model parameters to indicate the time correction and/or the frequency correction, frequent RRC/MAC-CE signaling to correct the time/frequency adjustment may be minimized, and the UE may perform a more autonomous adjustment of the time and/or the frequency of the uplink transmission. Further, the one or more parameters that indicate the time correction and/or the frequency correction may be beam/TRP/panel specific, and may be broadcasted to multiple UEs, which may further reduce a system overhead.

As indicated above, FIG. 7 is provided as an example. Other examples may differ from what is described with regard to FIG. 7.

Figure 8:
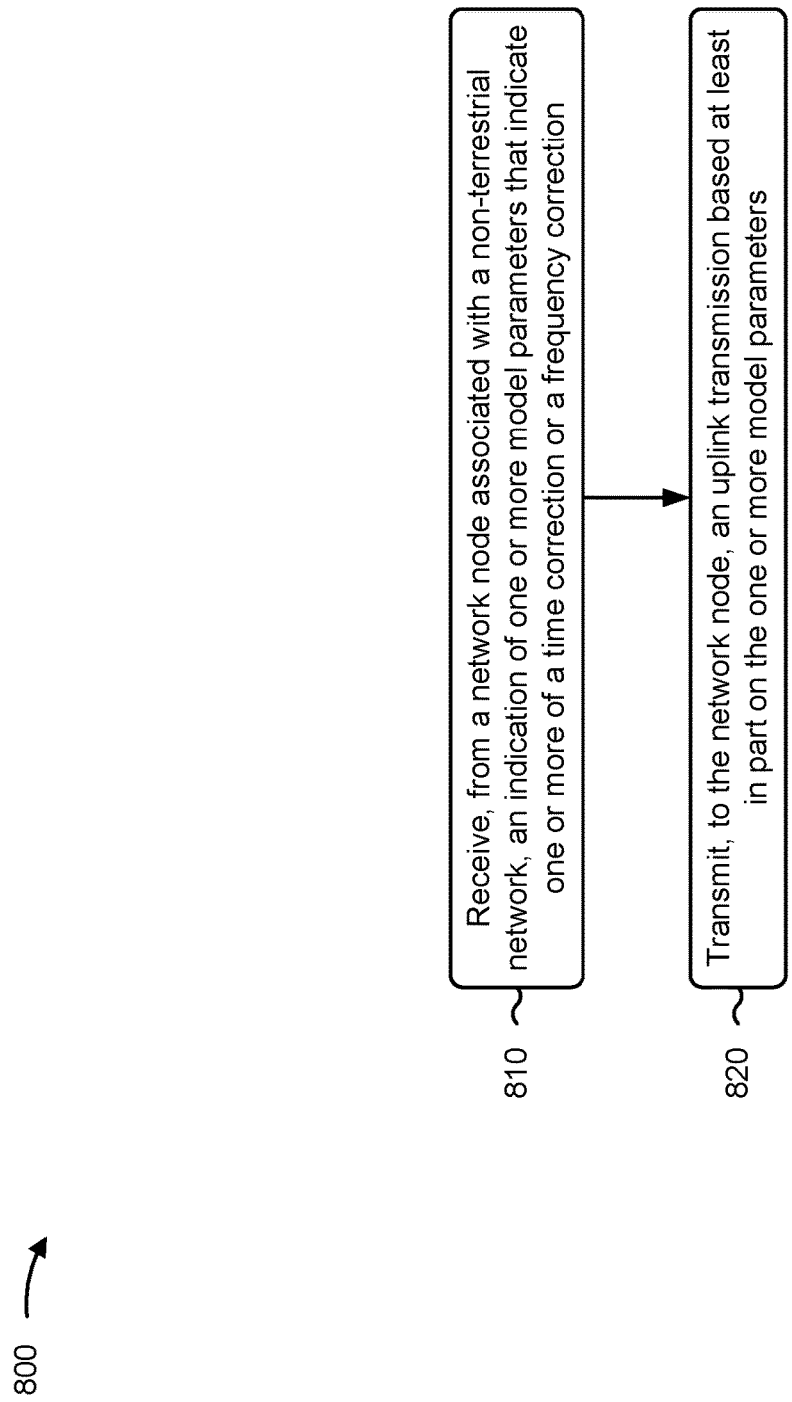
FIGS. 8-9 are diagrams illustrating example processes associated with signaling model parameters that indicate a time correction and/or a frequency correction for an uplink transmission, in accordance with the present disclosure.

FIG. 8 is a diagram illustrating an example process 800 performed, for example, by a UE, in accordance with the present disclosure. Example process 800 is an example where the UE (e.g., UE 120) performs operations associated with signaling model parameters that indicate a time correction and/or a frequency correction for an uplink transmission.

As shown in FIG. 8, in some aspects, process 800 may include receiving, from a network node associated with a non-terrestrial network, an indication of one or more model parameters that indicate one or more of a time correction or a frequency correction (block 810). For example, the UE (e.g., using reception component 1002, depicted in FIG. 10) may receive, from a network node associated with a non-terrestrial network, an indication of one or more model parameters that indicate one or more of a time correction or a frequency correction, as described above in connection with FIG. 7.

As further shown in FIG. 8, in some aspects, process 800 may include transmitting, to the network node, an uplink transmission based at least in part on the one or more model parameters (block 820). For example, the UE (e.g., using transmission component 1004, depicted in FIG. 10) may transmit, to the network node, an uplink transmission based at least in part on the one or more model parameters, as described above in connection with FIG. 7.

Process 800 may include additional aspects, such as any single aspect or any combination of aspects described below and/or in connection with one or more other processes described elsewhere herein.

In a first aspect, process 800 includes autonomously applying the one or more model parameters to the uplink transmission without explicit instructions from the network node.

In a second aspect, alone or in combination with the first aspect, the one or more model parameters are higher-order parameters, and the one or more model parameters are based at least in part on a polynomial format or a table-based configuration.

In a third aspect, alone or in combination with one or more of the first and second aspects, process 800 includes tracking an evolution of one or more of a frequency shift or a timing advance command based at least in part on the one or more model parameters.

In a fourth aspect, alone or in combination with one or more of the first through third aspects, process 800 includes receiving the indication via RRC signaling or a MAC-CE.

In a fifth aspect, alone or in combination with one or more of the first through fourth aspects, process 800 includes receiving the indication based at least in part on one or more UE capabilities.

In a sixth aspect, alone or in combination with one or more of the first through fifth aspects, process 800 includes transmitting, to the network node, one or more requests for the network node to enable or disable a feature associated with transmitting the one or more model parameters.

In a seventh aspect, alone or in combination with one or more of the first through sixth aspects, process 800 includes transmitting, to the network node, a request for an update of the one or more model parameters, wherein the request may be based at least in part on a location condition associated with the UE, and receiving, from the network node, one or more updated model parameters based at least in part on the request.

In an eighth aspect, alone or in combination with one or more of the first through seventh aspects, the one or more model parameters are based at least in part on one or more of: a beam, a TRP, or a panel used by the network node or the UE.

In a ninth aspect, alone or in combination with one or more of the first through eighth aspects, the one or more model parameters are broadcast to multiple UEs, including the UE, served by a same spatial resource.

In a tenth aspect, alone or in combination with one or more of the first through ninth aspects, the one or more model parameters are in terms of a correlation matrix or filter coefficients used to track dynamics of variables of interest, wherein the variables of interest include one or more of a timing advance value or a frequency pre-compensation value, and the correlation matrix or the filter coefficients are based at least in part on a relative trajectory of the UE.

In an eleventh aspect, alone or in combination with one or more of the first through tenth aspects, the one or more model parameters compensate for errors or mismatches in other quantities associated with the time correction or the frequency correction, and the other quantities include one or more of a UE-specific timing advance value, a common timing advance value, or a fixed offset value.

In a twelfth aspect, alone or in combination with one or more of the first through eleventh aspects, the one or more model parameters are associated with a time stamp, and the one or more model parameters become invalid after a defined time window and one or more updated model parameters are signaled to the UE.

In a thirteenth aspect, alone or in combination with one or more of the first through twelfth aspects, the one or more model parameters are associated with one or more of a UE position, a distance between the UE and the network node, or a relative trajectory of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
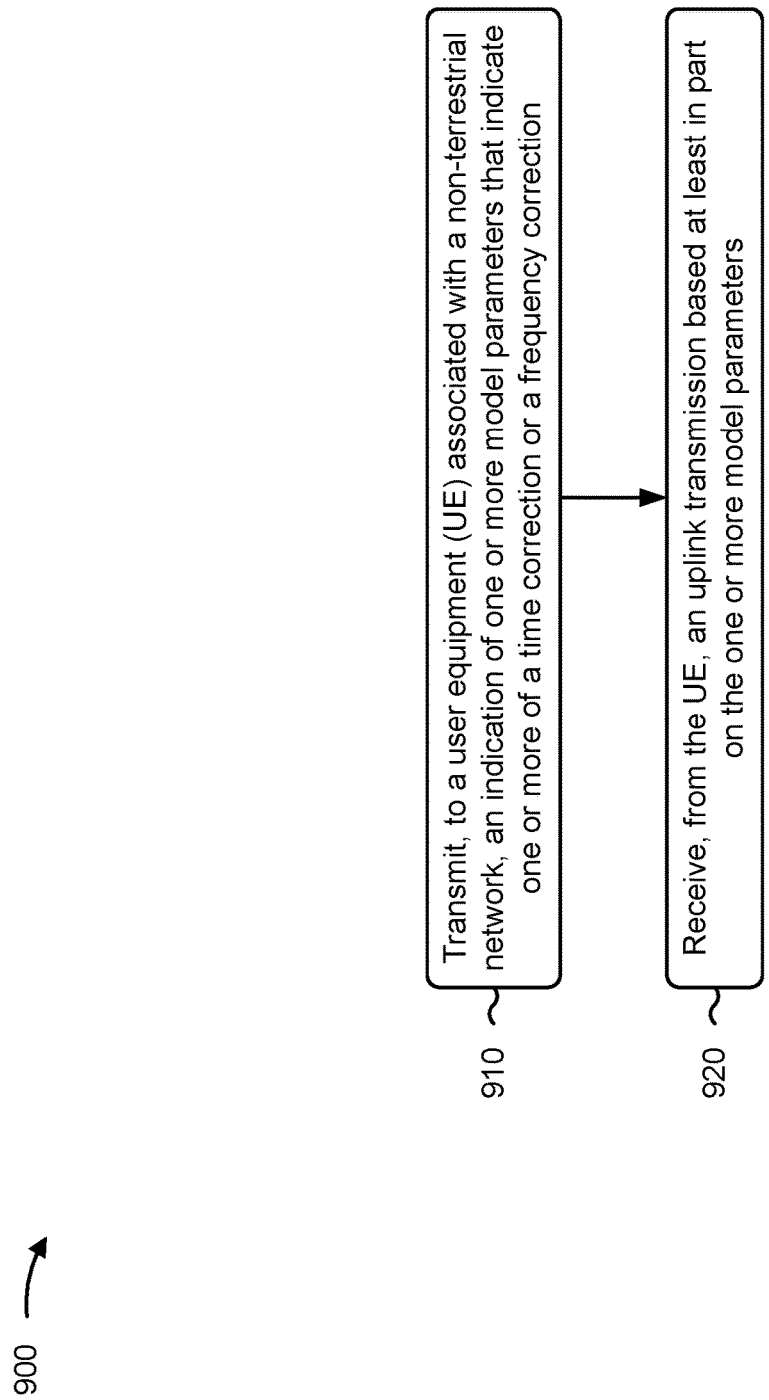

FIG. 9 is a diagram illustrating an example process 900 performed, for example, by a network node, in accordance with the present disclosure. Example process 900 is an example where the network node (e.g., network node 110) performs operations associated with signaling model parameters that indicate a time correction and/or a frequency correction for an uplink transmission.

As shown in FIG. 9, in some aspects, process 900 may include transmitting, to a UE associated with a non-terrestrial network, an indication of one or more model parameters that indicate one or more of a time correction or a frequency correction (block 910). For example, the network node (e.g., using transmission component 1104, depicted in FIG. 11) may transmit, to a UE associated with a non-terrestrial network, an indication of one or more model parameters that indicate one or more of a time correction or a frequency correction, as described above in connection with FIG. 7.

As further shown in FIG. 9, in some aspects, process 900 may include receiving, from the UE, an uplink transmission based at least in part on the one or more model parameters (block 920). For example, the network node (e.g., using reception component 1102, depicted in FIG. 11) may receive, from the UE, an uplink transmission based at least in part on the one or more model parameters, as described above in connection with FIG. 7.

Process 900 may include additional aspects, such as any single aspect or any combination of aspects described below and/or in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
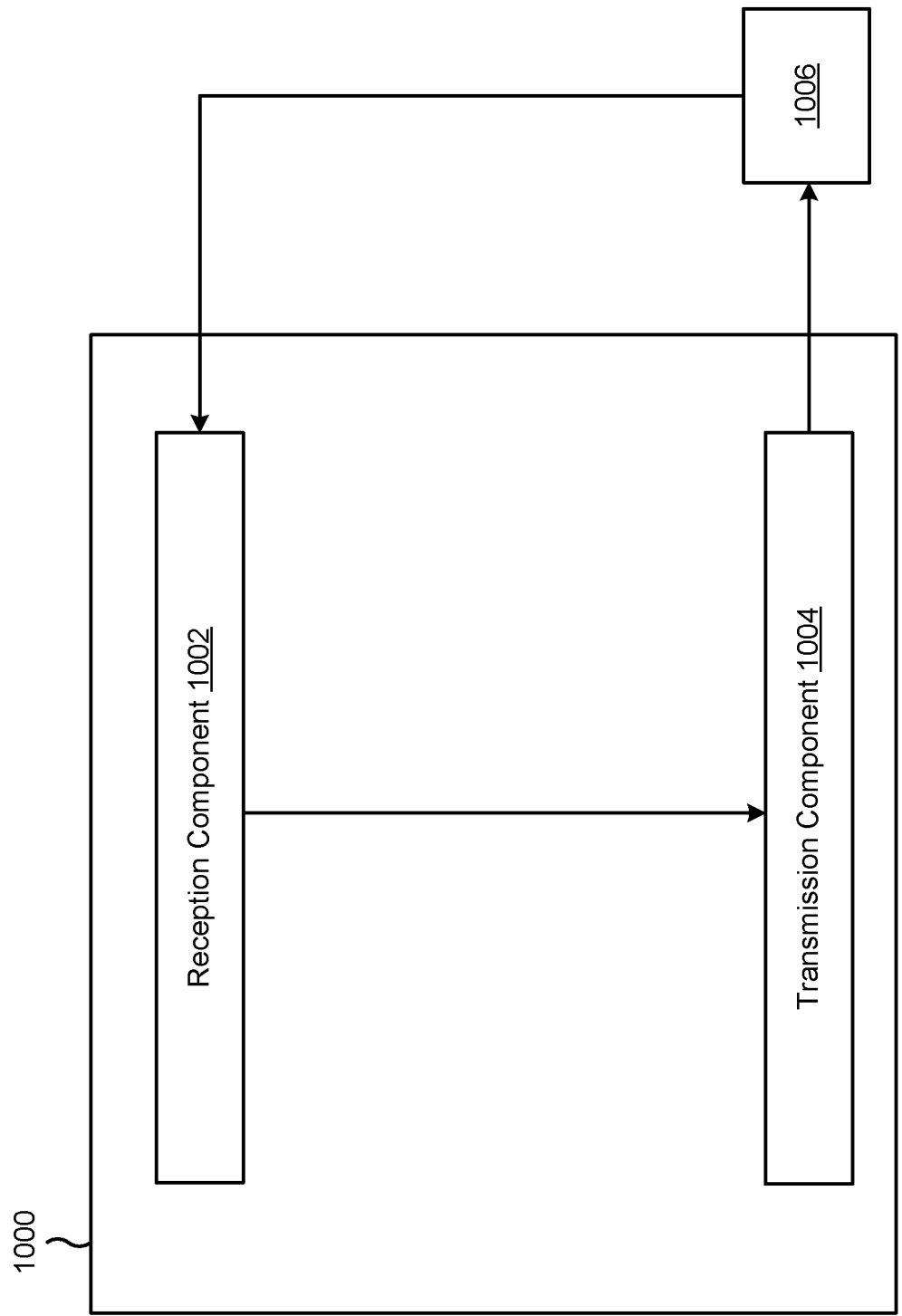
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network node associated with a non-terrestrial network, an indication of one or more model parameters that indicate one or more of a time correction or a frequency correction. The transmission component 1004 may transmit, to the network node, an uplink transmission based at least in part on the one or more model parameters.

The transmission component 1004 may transmit, to the network node, one or more requests for the network node to enable or disable a feature associated with transmitting the one or more model parameters. The transmission component 1004 may transmit, to the network node, a request for an update of the one or more model parameters, wherein the request may be based at least in part on a location condition associated with the UE. The reception component 1002 may receive, from the network node, one or more updated model parameters based at least in part on the request.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
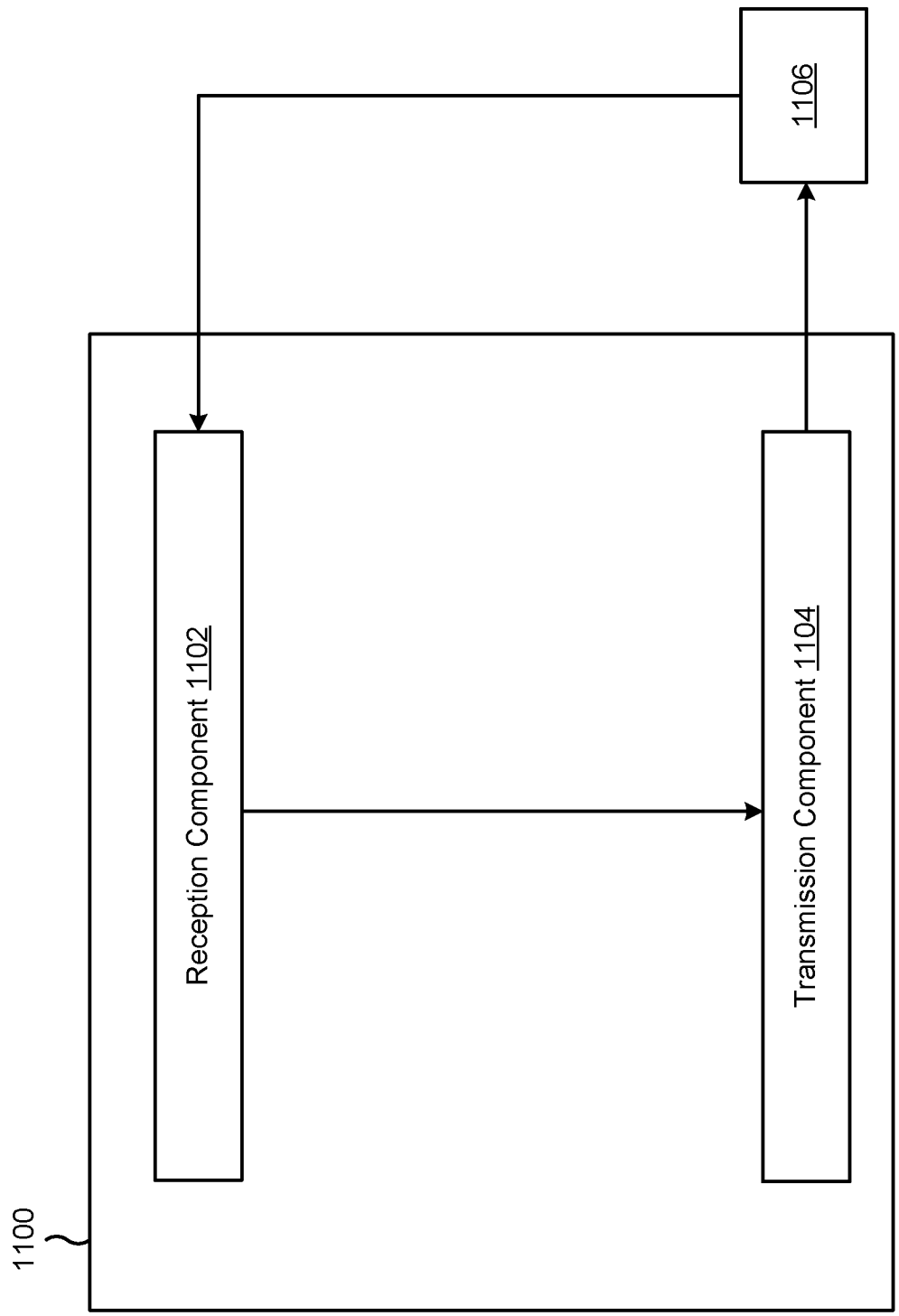

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit, to a UE associated with a non-terrestrial network, an indication of one or more model parameters that indicate one or more of a time correction or a frequency correction. The reception component 1102 may receive, from the UE, an uplink transmission based at least in part on the one or more model parameters.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network node associated with a non-terrestrial network, an indication of one or more model parameters that indicate one or more of a time correction or a frequency correction; and transmitting, to the network node, an uplink transmission based at least in part on the one or more model parameters.

Aspect 2: The method of Aspect 1, further comprising: autonomously applying the one or more model parameters to the uplink transmission without explicit instructions from the network node.

Aspect 3: The method of any of Aspects 1 through 2, wherein the one or more model parameters are higher-order parameters, and wherein the one or more model parameters are based at least in part on a polynomial format or a table-based configuration.

Aspect 4: The method of any of Aspects 1 through 3, further comprising: tracking an evolution of one or more of a frequency shift or a timing advance command based at least in part on the one or more model parameters.

Aspect 5: The method of any of Aspects 1 through 4, wherein receiving the indication of the one or more model parameters comprises receiving the indication via radio resource control signaling or a medium access control control element.

Aspect 6: The method of any of Aspects 1 through 5, wherein receiving the indication of the one or more model parameters comprises receiving the indication based at least in part on one or more UE capabilities.

Aspect 7: The method of any of Aspects 1 through 6, further comprising: transmitting, to the network node, one or more requests for the network node to enable or disable a feature associated with transmitting the one or more model parameters.

Aspect 8: The method of any of Aspects 1 through 7, further comprising: transmitting, to the network node, a request for an update of the one or more model parameters, wherein the request may be based at least in part on a location condition associated with the UE; and receiving, from the network node, one or more updated model parameters based at least in part on the request.

Aspect 9: The method of any of Aspects 1 through 8, wherein: the one or more model parameters are based at least in part on one or more of: a beam, a TRP, or a panel used by the network node or the UE.

Aspect 10: The method of any of Aspects 1 through 9, wherein the one or more model parameters are broadcast to multiple UEs, including the UE, served by a same spatial resource.

Aspect 11: The method of any of Aspects 1 through 10, wherein the one or more model parameters are in terms of a correlation matrix or filter coefficients used to track dynamics of variables of interest, wherein the variables of interest include one or more of a timing advance value or a frequency pre-compensation value, and wherein the correlation matrix or the filter coefficients are based at least in part on a relative trajectory of the UE.

Aspect 12: The method of any of Aspects 1 through 11, wherein the one or more model parameters compensate for errors or mismatches in other quantities associated with the time correction or the frequency correction, and wherein the other quantities include one or more of: a UE-specific timing advance value, a common timing advance value, or a fixed offset value.

Aspect 13: The method of any of Aspects 1 through 12, wherein the one or more model parameters are associated with a time stamp, and wherein the one or more model parameters become invalid after a defined time window and one or more updated model parameters are signaled to the UE.

Aspect 14: The method of any of Aspects 1 through 13, wherein the one or more model parameters are associated with one or more of: a UE position, a distance between the UE and the network node, or a relative trajectory of the UE.

Aspect 15: A method of wireless communication performed by a network node, comprising: transmitting, to a user equipment (UE) associated with a non-terrestrial network, an indication of one or more model parameters that indicate one or more of a time correction or a frequency correction; and receiving, from the UE, an uplink transmission based at least in part on the one or more model parameters.

Aspect 16: An apparatus for wireless communication at a device, comprising: a processor; memory coupled with the processor; and instructions stored in the memory and executable by the processor to cause the apparatus to perform the method of one or more of Aspects 1-14.

Aspect 17: A device for wireless communication, comprising a memory and one or more processors coupled to the memory, the one or more processors configured to perform the method of one or more of Aspects 1-14.

Aspect 18: An apparatus for wireless communication, comprising at least one means for performing the method of one or more of Aspects 1-14.

Aspect 19: A non-transitory computer-readable medium storing code for wireless communication, the code comprising instructions executable by a processor to perform the method of one or more of Aspects 1-14.

Aspect 20: A non-transitory computer-readable medium storing a set of instructions for wireless communication, the set of instructions comprising one or more instructions that, when executed by one or more processors of a device, cause the device to perform the method of one or more of Aspects 1-14.

Aspect 21: An apparatus for wireless communication at a device, comprising a processor; memory coupled with the processor; and instructions stored in the memory and executable by the processor to cause the apparatus to perform the method of Aspect 15.

Aspect 22: A device for wireless communication, comprising a memory and one or more processors coupled to the memory, the one or more processors configured to perform the method of Aspect 15.

Aspect 23: An apparatus for wireless communication, comprising at least one means for performing the method of Aspect 15.

Aspect 24: A non-transitory computer-readable medium storing code for wireless communication, the code comprising instructions executable by a processor to perform the method of Aspect 15.

Aspect 25: A non-transitory computer-readable medium storing a set of instructions for wireless communication, the set of instructions comprising one or more instructions that, when executed by one or more processors of a device, cause the device to perform the method of Aspect 15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   memory; and
   one or more processors, coupled to the memory, configured to:
      receive, from a network node associated with a non-terrestrial network, an indication of one or more model parameters that indicate one or more of a time correction or a frequency correction, wherein the one or more model parameters are in terms of a correlation matrix or filter coefficients used to track dynamics of variables of interest, and wherein the correlation matrix or the filter coefficients are based at least in part on a relative trajectory of the UE; and
      transmit, to the network node, an uplink transmission based at least in part on the one or more model parameters.

2. The apparatus of claim 1, wherein the one or more processors are further configured to:
   autonomously apply the one or more model parameters to the uplink transmission without explicit instructions from the network node.

3. The apparatus of claim 1, wherein the one or more model parameters are higher-order parameters, and wherein the one or more model parameters are based at least in part on a polynomial format or a table-based configuration.

4. The apparatus of claim 1, wherein the one or more processors are further configured to:
   track an evolution of one or more of a frequency shift or a timing advance command based at least in part on the one or more model parameters.

5. The apparatus of claim 1, wherein the one or more processors, to receive the indication of the one or more model parameters, are configured to receive the indication via radio resource control signaling or a medium access control control element.

6. The apparatus of claim 1, wherein the one or more processors, to receive the indication of the one or more model parameters, are configured to receive the indication based at least in part on one or more UE capabilities.

7. The apparatus of claim 1, wherein the one or more processors are further configured to:
   transmit, to the network node, one or more requests for the network node to enable or disable a feature associated with transmitting the one or more model parameters.

8. The apparatus of claim 1, wherein the one or more processors are further configured to:
   transmit, to the network node, a request for an update of the one or more model parameters, wherein the request may be based at least in part on a location condition associated with the UE; and
   receive, from the network node, one or more updated model parameters based at least in part on the request.

9. The apparatus of claim 1, wherein the one or more model parameters are based at least in part on one or more of: a beam, a transmission reception point, or a panel used by the network node or the UE.

10. The apparatus of claim 1, wherein the one or more model parameters are broadcast to multiple UEs, including the UE, served by a same spatial resource.

11. The apparatus of claim 1, wherein the one or more model parameters compensate for errors or mismatches in other quantities associated with the time correction or a frequency correction, and wherein the other quantities include one or more of: a UE-specific timing advance value, a common timing advance value, or a fixed offset value.

12. The apparatus of claim 1, wherein the one or more model parameters are associated with a time stamp, and wherein the one or more model parameters become invalid after a defined time window and one or more updated model parameters are signaled to the UE.

13. The apparatus of claim 1, wherein the variables of interest include one or more of a timing advance value or a frequency pre-compensation value.

14. An apparatus for wireless communication at a network node, comprising:
   memory; and
   one or more processors, coupled to the memory, configured to:
      transmit, to a user equipment (UE) associated with a non-terrestrial network, an indication of one or more model parameters that indicate one or more of a time correction or a frequency correction, wherein the one or more model parameters are in terms of a correlation matrix or filter coefficients used to track dynamics of variables of interest, and wherein the correlation matrix or the filter coefficients are based at least in part on a relative trajectory of the UE; and
      receive, from the UE, an uplink transmission based at least in part on the one or more model parameters.

15. The apparatus of claim 14, wherein the variables of interest include one or more of a timing advance value or a frequency pre-compensation value.

16. A method of wireless communication performed by a user equipment (UE), comprising:
   receiving, from a network node associated with a non-terrestrial network, an indication of one or more model parameters that indicate one or more of a time correction or a frequency correction, wherein the one or more model parameters are in terms of a correlation matrix or filter coefficients used to track dynamics of variables of interest, and wherein the correlation matrix or the filter coefficients are based at least in part on a relative trajectory of the UE; and
   transmitting, to the network node, an uplink transmission based at least in part on the one or more model parameters.

17. The method of claim 16, further comprising:
   autonomously applying the one or more model parameters to the uplink transmission without explicit instructions from the network node.

18. The method of claim 16, wherein the one or more model parameters are higher-order parameters, and wherein the one or more model parameters are based at least in part on a polynomial format or a table-based configuration.

19. The method of claim 16, further comprising:
tracking an evolution of one or more of a frequency shift or a timing advance command based at least in part on the one or more model parameters.

20. The method of claim 16, wherein receiving the indication of the one or more model parameters comprises receiving the indication via radio resource control signaling or a medium access control control element.

21. The method of claim 16, wherein receiving the indication of the one or more model parameters comprises receiving the indication based at least in part on one or more UE capabilities.

22. The method of claim 16, further comprising:
transmitting, to the network node, one or more requests for the network node to enable or disable a feature associated with transmitting the one or more model parameters.

23. The method of claim 16, further comprising:
transmitting, to the network node, a request for an update of the one or more model parameters, wherein the request may be based at least in part on a location condition associated with the UE; and
receiving, from the network node, one or more updated model parameters based at least in part on the request.

24. The method of claim 16, wherein the one or more model parameters are based at least in part on one or more of: a beam, a TRP, or a panel used by the network node or the UE.

25. The method of claim 16, wherein the one or more model parameters are broadcast to multiple UEs, including the UE, served by a same spatial resource.

26. The method of claim 16, wherein the one or more model parameters compensate for errors or mismatches in other quantities associated with the time correction or a frequency correction, and wherein the other quantities include one or more of: a UE-specific timing advance value, a common timing advance value, or a fixed offset value.

27. The method of claim 16, wherein the one or more model parameters are associated with a time stamp, and wherein the one or more model parameters become invalid after a defined time window and one or more updated model parameters are signaled to the UE.

28. The method of claim 16, wherein the variables of interest include one or more of a timing advance value or a frequency pre-compensation value.

29. A method of wireless communication performed by a network node, comprising:
transmitting, to a user equipment (UE) associated with a non-terrestrial network, an indication of one or more model parameters that indicate one or more of a time correction or a frequency correction, wherein the one or more model parameters are in terms of a correlation matrix or filter coefficients used to track dynamics of variables of interest, and wherein the correlation matrix or the filter coefficients are based at least in part on a relative trajectory of the UE; and
receiving, from the UE, an uplink transmission based at least in part on the one or more model parameters.

30. The method of claim 29, wherein the variables of interest include one or more of a timing advance value or a frequency pre-compensation value.

* * * * *